(12) United States Patent
Mishra et al.

(10) Patent No.: US 11,119,696 B2
(45) Date of Patent: Sep. 14, 2021

(54) TECHNIQUE OF REGISTER SPACE EXPANSION WITH BRANCHED PAGING

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 16/508,136

(22) Filed: Jul. 10, 2019

(65) Prior Publication Data

US 2020/0042248 A1    Feb. 6, 2020

Related U.S. Application Data

(60) Provisional application No. 62/712,783, filed on Jul. 31, 2018.

(51) Int. Cl.
*G06F 3/06*      (2006.01)
*G06F 9/30*      (2018.01)
*G06F 13/42*     (2006.01)

(52) U.S. Cl.
CPC .......... *G06F 3/0659* (2013.01); *G06F 3/0604* (2013.01); *G06F 3/0673* (2013.01); *G06F 9/30054* (2013.01); *G06F 9/30098* (2013.01); *G06F 13/4282* (2013.01)

(58) Field of Classification Search
CPC . G06F 13/4282; G06F 3/0659; G06F 9/30098
See application file for complete search history.

(56) References Cited

U.S. PATENT DOCUMENTS

2017/0116141 A1\* 4/2017 Mishra ................... G06F 13/102
2017/0118125 A1\* 4/2017 Mishra ................... H04L 45/74

\* cited by examiner

*Primary Examiner* — Zachary K Huson
(74) *Attorney, Agent, or Firm* — QUALCOMM Incorporated

(57) ABSTRACT

Systems, methods, and apparatus for increasing register space on a slave device are described. A method performed at a device coupled to a serial bus includes receiving a datagram from a serial bus, the datagram including a command directed to a first register address in a first page of registers, writing data in a payload of the datagram to a second register address in a second page of registers when the command is a write command, and reading data from the second register address in the second page of registers when the command is a read command. The second register address is identified in the datagram when the command is a write command.

30 Claims, 12 Drawing Sheets

RFFE Register Space

| Page# | Address Region | Register Count | Assignment |
|---|---|---|---|
| Page-00 | 0x0000 – 0x001B | 28 | User Defined |
| | 0x001C – 0x003F | 36 | Reserved for MIPI-RFFE Specification usage |
| | 0x0040 – 0x00FF | 192 | User Defined |
| Page-01 | 0x0100 – 0x01FF | 256 | User Defined |
| Page-02 | 0x0100 – 0x01FF | 256 | User Defined |
| Page-03 | 0x0100 – 0x01FF | 256 | User Defined |
| ... | ... | ... | ... |
| Page-254 | 0x0100 – 0x01FF | 256 | Reserved |
| Page-255 | 0x0100 – 0x01FF | 256 | Reserved |

Number of pages: 256
Registers in each page: 256
Total possible registers: 64k

*FIG. 5*

TECHNIQUE OF REGISTER SPACE EXPANSION WITH BRANCHED PAGING

PRIORITY

This application claims priority to and the benefit of U.S. Provisional Patent Application Ser. No. 62/712,783 filed in the U.S. Patent Office on Jul. 31, 2018, the entire content of this application being incorporated herein by reference as if fully set forth below in its entirety and for all applicable purposes.

TECHNICAL FIELD

The present disclosure relates generally to serial communication over a shared serial bus and, more particularly, to increasing available configuration register space in slave devices.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the system power management interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. SPMI protocols define a hardware interface that may be implemented between baseband or application processors and peripheral components. In some instances, SPMI protocols are implemented to support power management operations within a device.

In many instances, a multi-drop serial bus may be provided to support large numbers of devices that implement complex applications. The register space provided by standards and protocols for configuring features and functions of slave devices may be insufficient to facilitate efficient device operations. As mobile communication devices continue to include a greater level of functionality, increased register space will be required.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes receiving a datagram from a serial bus, the datagram including a command directed to a first register address in a first page of registers, writing data carried as a payload of the datagram to a second register address in a second page of registers when the command is a write command, and reading data from the second register address in the second page of registers when the command is a read command. The second register address is identified in the datagram when the command is a write command.

In some aspects, the method includes receiving configuration information identifying the first register address as a branch address, and identifying the second page of registers based on an association of the first register address with the second page of registers defined by the configuration information. The second register address may be identified in the payload when the command is a write command.

In various aspects, the command is an explicit branched-page command. The method may include receiving configuration information associating the command with the second page of registers, and identifying the second page of registers based on the configuration information.

In various aspects of the disclosure, an apparatus includes an interface circuit adapted to couple the apparatus to a first serial bus, and a processor. The processor may be configured to receive a datagram from a serial bus, the datagram including a command directed to a first register address in a first page of registers, write data carried as a payload of the datagram to a second register address in a second page of registers when the command is a write command, and read data from the second register address in the second page of registers when the command is a read command. The second register address may be identified in the datagram when the command is a write command.

In various aspects of the disclosure, a processor-readable storage medium stores code for receiving a datagram from a serial bus, the datagram including a command directed to a first register address in a first page of registers, writing data carried as a payload of the datagram to a second register address in a second page of registers when the command is a write command, and reading data from the second register address in the second page of registers when the command is a read command. The second register address may be identified in the datagram when the command is a write command.

In various aspects of the disclosure, an apparatus includes means for receiving datagrams from a serial bus. The means for receiving datagrams may be configured to receive a first datagram that includes a command directed to a first register address in a first page of registers. The apparatus may include means for writing data carried as a payload of the first datagram to a second register address in a second page of registers when the command is a write command, and means for reading data from the second register address in the second page of registers when the command is a read command. The second register address may be identified in the first datagram when the command is a write command.

BRIEF DESCRIPTION OF THE DRAWINGS

FIG. 5 illustrates a memory map that summarizes the structure of the register space addressable through a serial bus that is operated in accordance with RFFE protocols.

DETAILED DESCRIPTION

Figure 1:
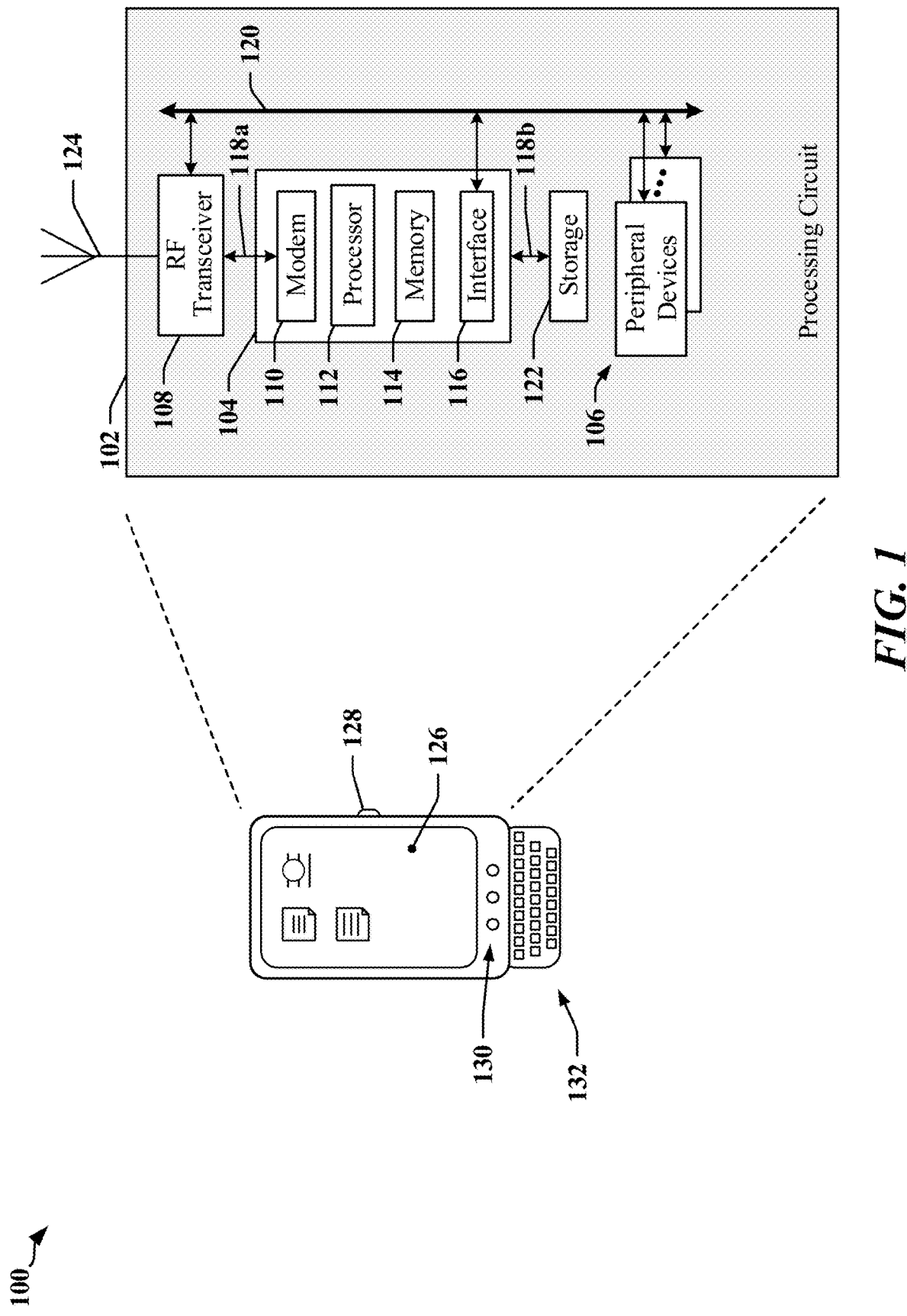
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased functionality and complexity of operations involving devices coupled to serial buses, together with the imposition of more stringent timing constraints in support of applications, peripherals and sensors can result in shortages of available registers that can be written using low-latency commands.

Certain aspects of the disclosure relate to techniques for increasing the number of registers that can be addressed through a page of registers defined by a memory map for devices coupled to a bus that is operated in accordance with one or more standardized protocols. A method performed at a device coupled to a serial bus includes receiving a datagram from a serial bus, the datagram including a command directed to a first register address in a first page of registers, writing data in a payload of the datagram to a second register address in a second page of registers when the command is a write command, and reading data from the second register address in the second page of registers when the command is a read command. The second register address is identified in the datagram when the command is a write command.

Certain aspects disclosed herein may be applicable to a serial bus operated in accordance with an I2C, I3C, SPMI, and/or RFFE protocol, or other protocol. Certain aspects are applicable to a serial bus operated in half-duplex mode or full-duplex mode. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
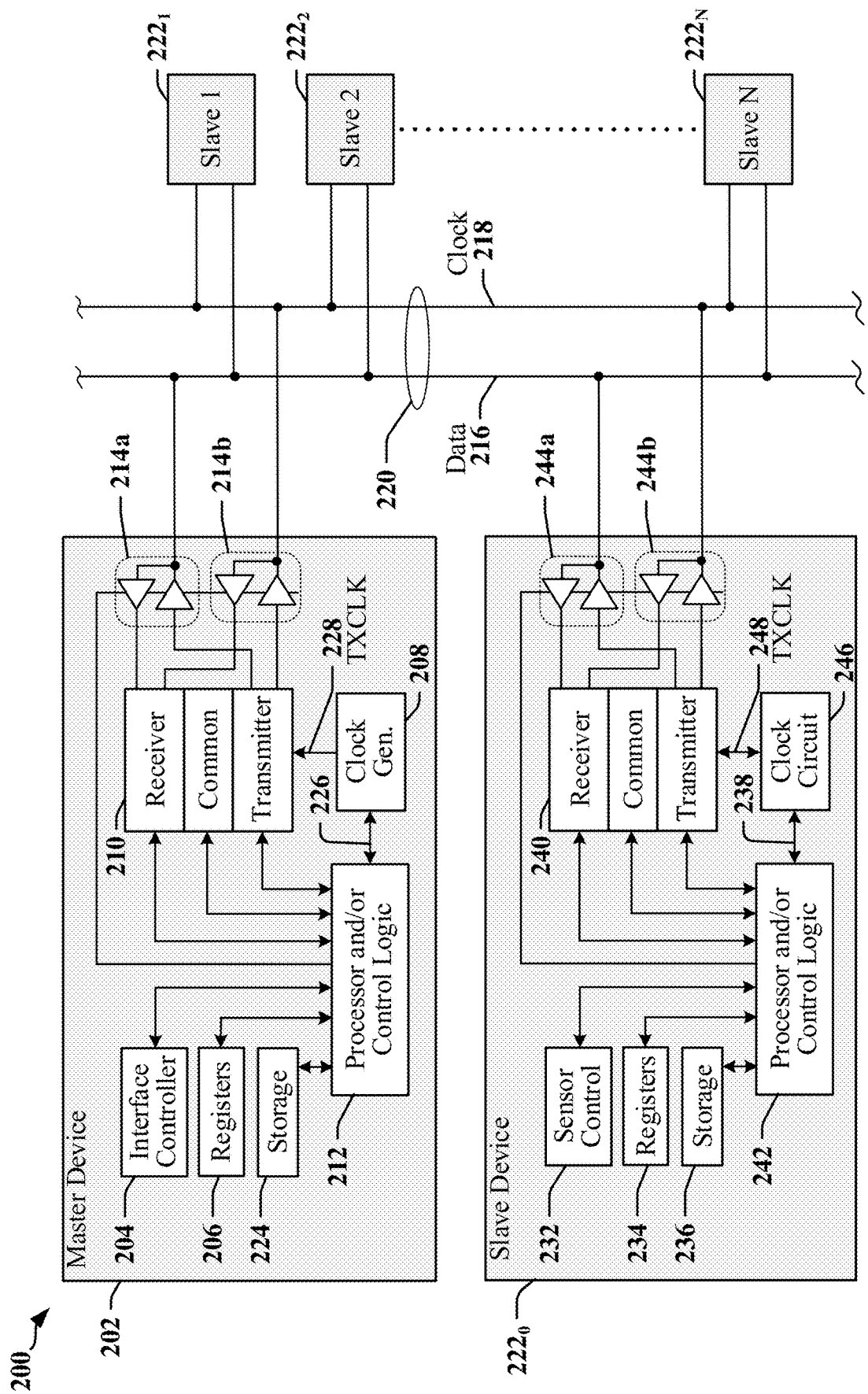
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with I2C, I3C, RFFE, SPMI, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
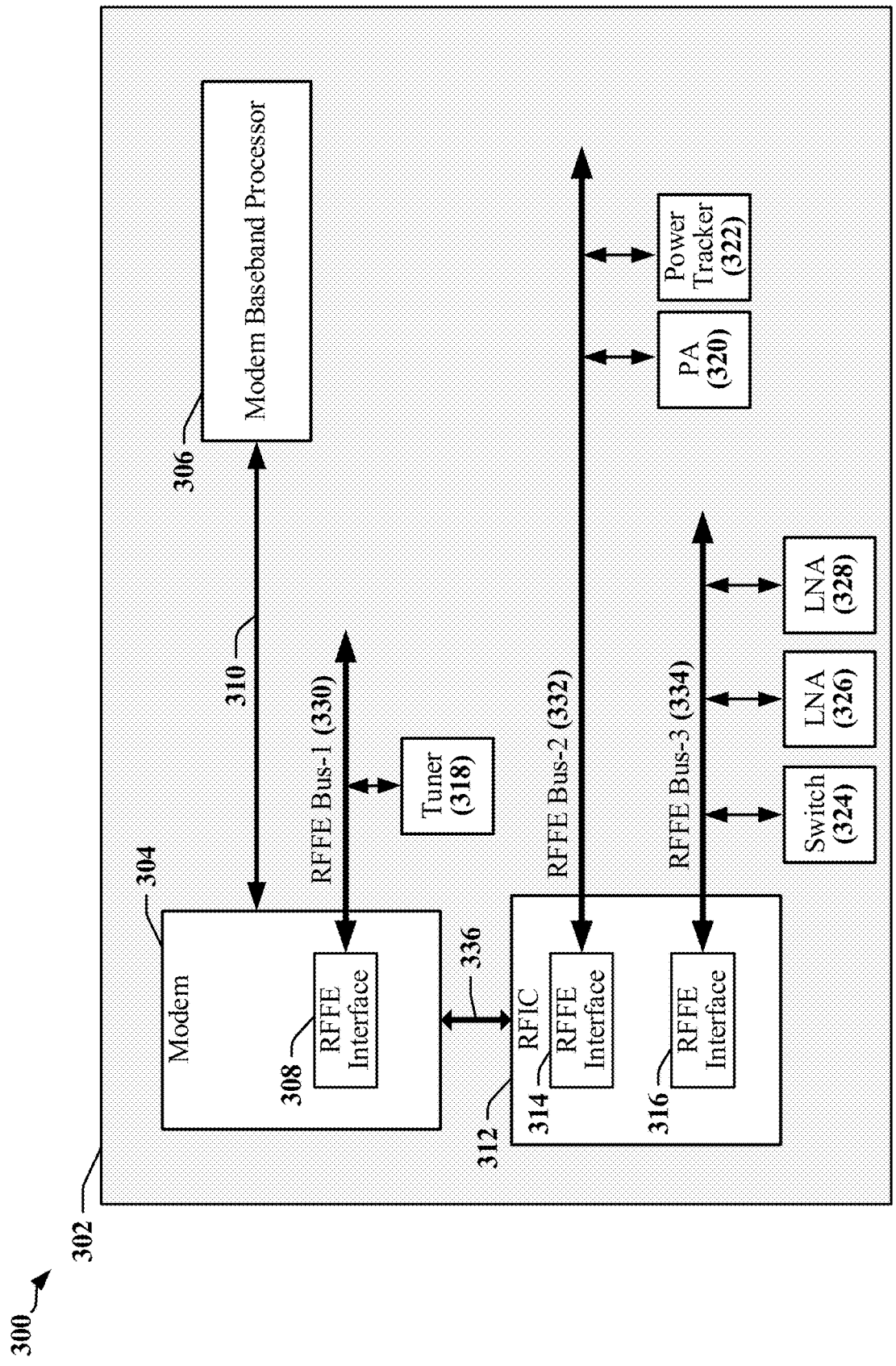
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages include coexistence messages. Coexistence management (CxM) messages are transmitted in a multisystem platform to prevent or reduce instances of certain types of RFFE device impinging on each other. RFFE devices that may be the source or subject of CxM messages include, for example, switches 324, LNAs 326, 328, PAs 320 and other types of device that operate concurrently in a manner that generates inter-device RF interference, and/or that could potentially cause damage to one or more devices. CxM messages may be exchanged between certain devices that are shared between different radio access technologies, wireless subscriptions and/or applications. For example, a switch 324, LNA 326, 328, PA 320 and/or an antenna may be shared by two different radio access technologies which have different transmit and receive schedules, and damage to an LNA 326, 328 or other device may occur if a device begins transmitting using one radio access technology while receiving using another radio access technology. Devices that can interfere with one another may exchange CxM messages to permit each device to signal imminent actions that may result in interference or conflict. For example, two modems 304 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

In accordance with certain aspects disclosed herein, a multi-drop interface, operated in accordance with a protocol such as the RFFE, SPMI, I3C, protocol or another such protocol, can be used to reduce the number of physical I/O pins used to communicate between multiple devices by consolidating signaling onto a high-performance, low-latency serial bus. Protocols that support communication over a multi-drop serial bus may define a datagram structure used to transmit command, control and data payloads within application-defined latency tolerances. Performance and latency of a serial bus may be determined to some degree by datagram structures defined by the protocols used to operate the serial bus. Datagram structures for different protocols define certain common features, including addressing used to select devices to receive or transmit data, clock generation and management, interrupt processing and device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures.

Figure 4:
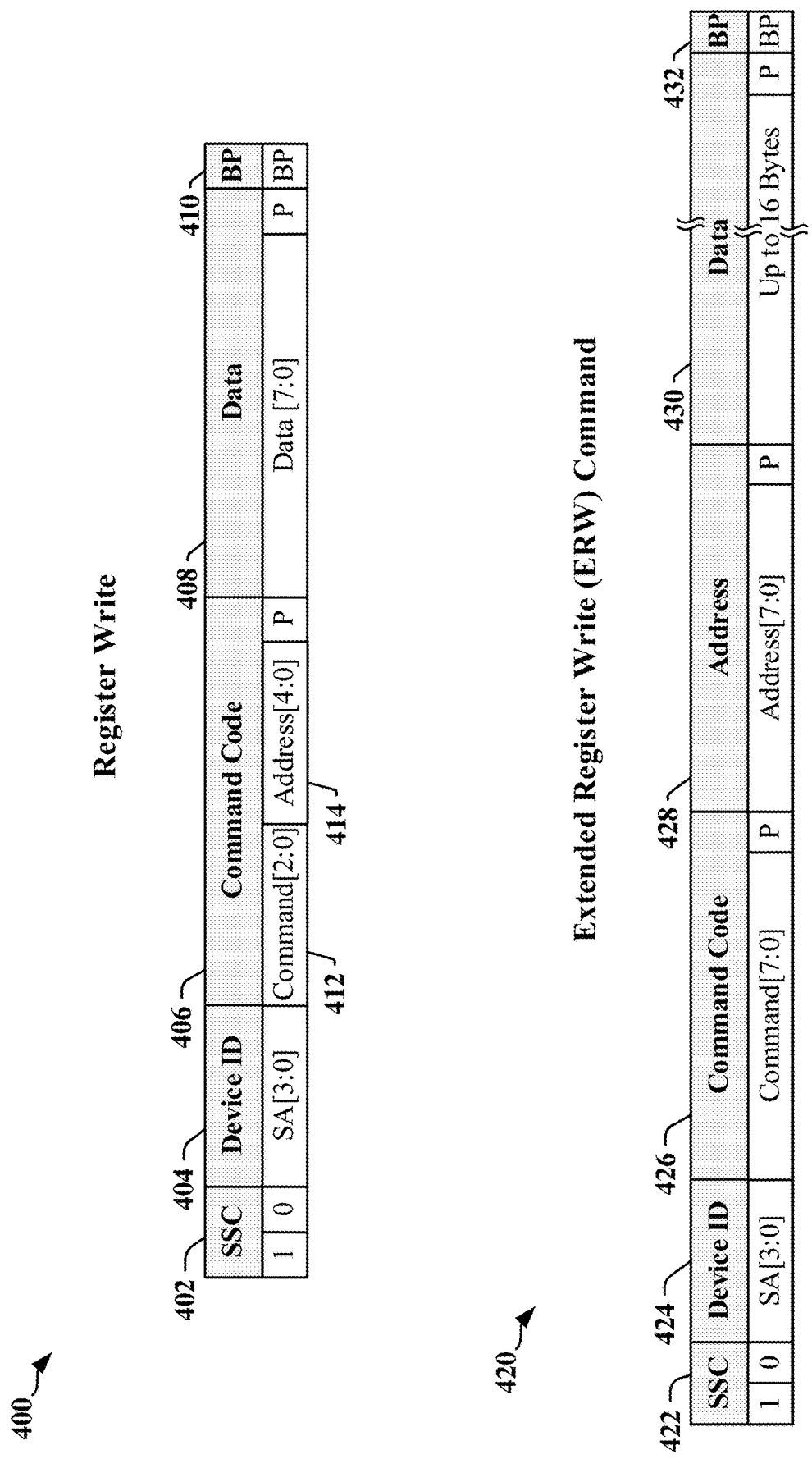
FIG. 4 illustrates datagram structures defined by RFFE protocols.

FIG. 4 illustrates datagram structures for a Register Write (RW) command 400 and an Extended Register Write (ERW) command 420. The datagram structures are defined by RFFE protocols, and can be used to efficiently write data to registers within the addressable register address range of a slave device. The RW command 400 and the ERW command 420 commence with transmission of a two-bit sequence start condition (SSC 402, 422) followed by a four-bit device ID 404, 424. A nine-bit command field 406, 426 is transmitted next. In the RW command 400, the nine-bit command field 406 includes a three-bit command code 412, a five-bit address field 414 and a parity bit. In the ERW command 420, the nine-bit command field 406 is occupied by an eight-bit command code and a parity bit and followed by an address field 428 that carries an eight-bit register address and a parity bit. In the RW command 400, a data field 408 carries a single data byte, while in the ERW command 420, the data field 430 carries up to 16 data bytes. Each data byte is transmitted with a parity bit. Bus park signaling 410, 432 terminates the command 400, 420.

Register Space in an RFFE Slave Device

FIG. 5 illustrates a memory map 500 that summarizes the structure of the register space addressable through a serial bus that is operated in accordance with certain RFFE protocols. RFFE protocols define a register space with an addressable range of 64K that can be assigned to registers and/or memory used by applications. The register space is organized into 256 pages, identified by a page number 502. Each page includes 256 addressable registers.

RFFE standards specify certain areas of the register space that can be reserved for control and/or configuration use in some application or in all applications. Certain registers are reserved for compliancy, inter-operability, ease of access and for other reasons. For example, the RFFE specification reserves and/or identifies a set of registers (the RFFE registers 506) for special usage in the address region of 0x001C to 0x003F (36 registers). The RFFE registers 506 are located in Page-00 504 at the lower address region of the 64 KB address space (0x0000 to 0xFFFF) and are accessible using the RW command 400 and a corresponding Register Read command, which can address registers within the 0x0000 to 0x001F address range. The EWR command 420 and a corresponding Extended Register Read command can address registers within the 0x0000 to 0x00FF address range. The availability of these commands can be used to meet requirements for fast access and lower latency in accessing certain registers in the RFFE registers 506.

The RFFE specification is constantly evolving and there is critical need of additional reserved registers in the lower address region. This need cannot typically or always be met within the constraints of the conventional register-space architecture.

Certain aspects disclosed herein provide access to additional control and/or configuration register space without extending the current register space or modifying the memory map 500. The additional control and/or configuration register space may be provided using the branched-paging technique disclosed herein.

Figure 6:
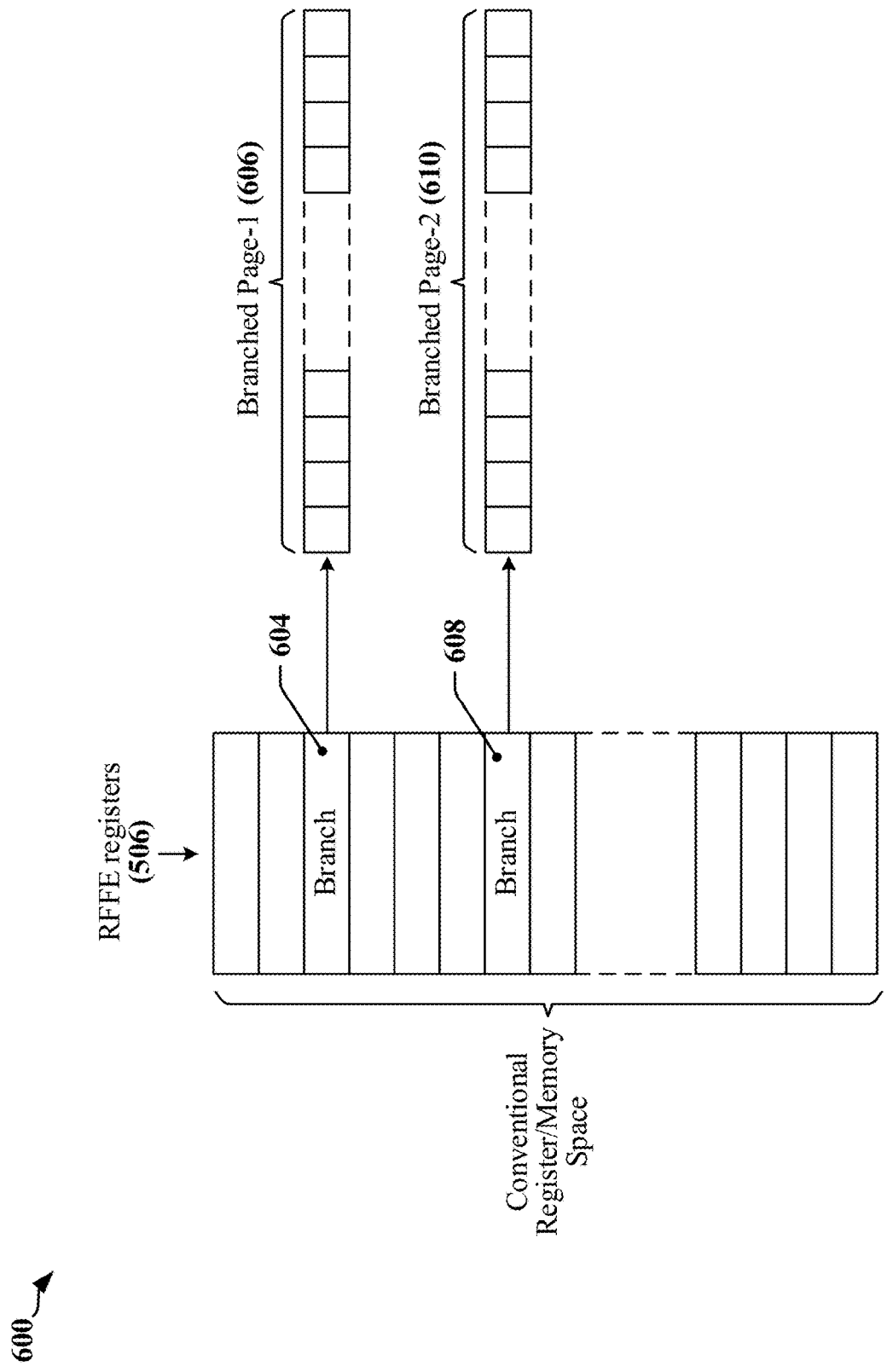
FIG. 6 illustrates a first example of branched-paging in accordance with certain aspects disclosed herein.

FIG. 6 illustrates a first example 600 of branched-paging based on predefined address identification. In this example 600, the addresses of certain registers in the RFFE registers 506 may be designated as branch addresses 604, 608. When a datagram is directed to a branch address 604, 608, the payload of the register is written to registers in an extension page 606, 610 associated with the branch addresses 604, 608. Additional addressing information in the payload of the datagram identifies a start address in the extension page 606, 610 for writing the remaining data in the payload. In some implementations, the extension pages 606, 610 are provided in registers or memory maintained separate from the 64 k registers defined by RFFE specifications. In the latter implementations, the branched-paging technique may be referred to as branched-paged extension. In other implementations, the extension pages 606, 610 are provided in registers or memory located at a different address and/or within a different page within the 64 k registers defined by RFFE specifications. In the latter implementations, the branched-paging technique may be referred to as branched-paged redirection can be used to extend the application of low latency read and write commands. In other implementations, a combination of branched-paged extension and branched-paged redirection may be employed.

In many implementations, there is a need for extending available register space in Page-00 504, and the use of the branched-paging techniques is described herein in the context of certain examples related to Page-00 504. In certain implementations, the branched-paging technique can be used to provide extension pages 606, 610 that can be linked to registers located in any page. The branched-paging technique disclosed herein can provide additional register-space accessible within a page without impacting the register space already assigned for a specific use by protocol or application.

Figure 7:
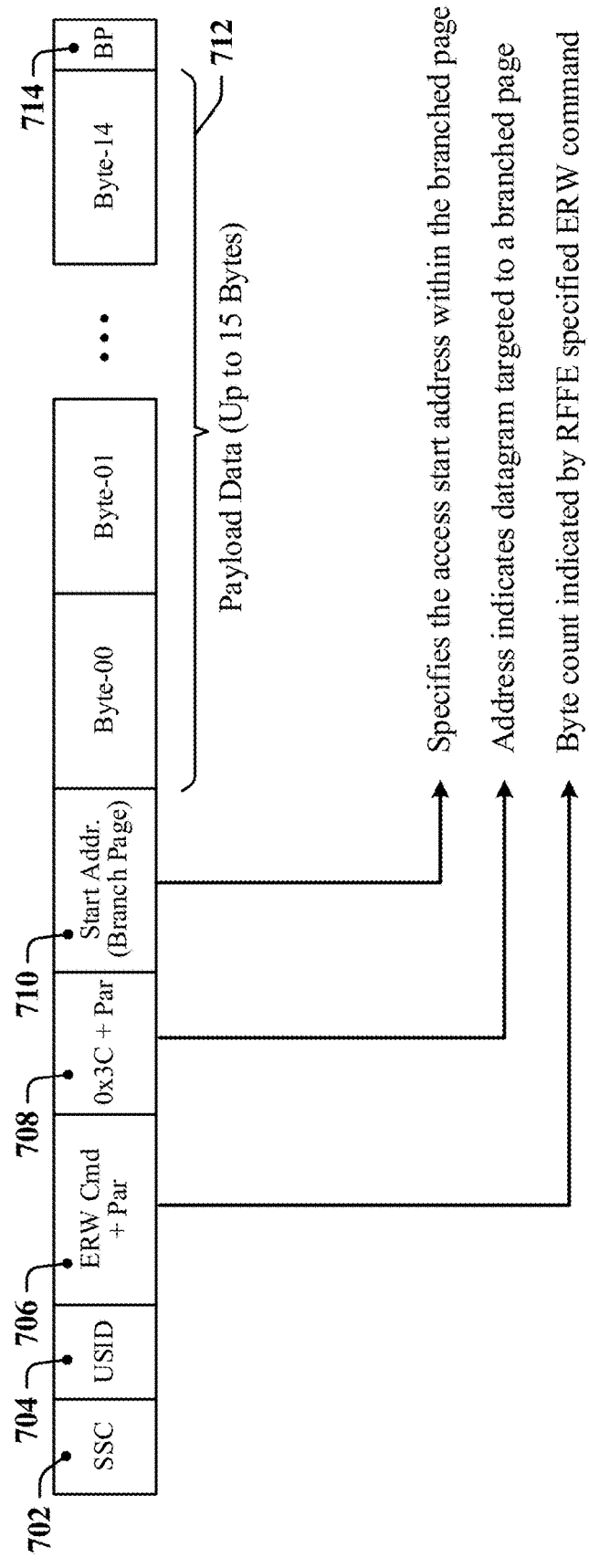
FIG. 7 illustrates a first example of a datagram that may be used to access registers in an extension page in accordance with certain aspects disclosed herein.

FIG. 7 illustrates an example of a datagram 700 that may be used to access registers in an extension page 606, 610 when branched-paging is based on predefined or preconfigured address identification. The datagram 700 corresponds to a conventional RFFE ERW command 420 and requires no changes in the basic protocol to transmit and/or receive multiple bytes to and/or from an extension page 606, 610. The datagram 700 commences with transmission of a two-bit SSC 702 followed by a four-bit unique slave identifier (USID 704). A nine-bit command field 706 has an eight-bit command code and a parity bit. The command code may correspond to an extended read or write command. RFFE protocols define the maximum length of the data payload and, for an extended read or write command, the payload has a maximum length of 16 bytes.

The command field 706 is followed by an address field 708 that carries an eight-bit register address and a parity bit. When a branched-paging read or write is desired, the register address in the address field 708 is set to a preconfigured value that indicates an extension page 606, 610. A receiving slave device may be configured to redirect the target of the command to an extension page 606, 610 that is associated in configuration information with the preconfigured value in the address field 708. In the illustrated example, the protocol handler in a slave device is configured to recognize that an address field 708 that includes 0x3C as the register address indicates branched-paging. The protocol handler may look up the location of the corresponding extension page 606 or 610 to process the datagram 700 further. In some examples, multiple preconfigured addresses are defined where each preconfigured address is associated with a different extension page 606, 610. In some examples, different command codes can be used to select different extension pages 606, 610 for the same preconfigured address.

The first byte of the payload is repurposed to carry a start address 710 that represents the register address in the extension page 606, 610 targeted by the command field 706 and/or address field 708. The remaining payload data bytes 712 may be written to registers in the targeted extension page 606, 610 at addresses commencing at the register address specified by the start address 710. Bus park signaling 714 terminates the datagram 700.

Figure 8:
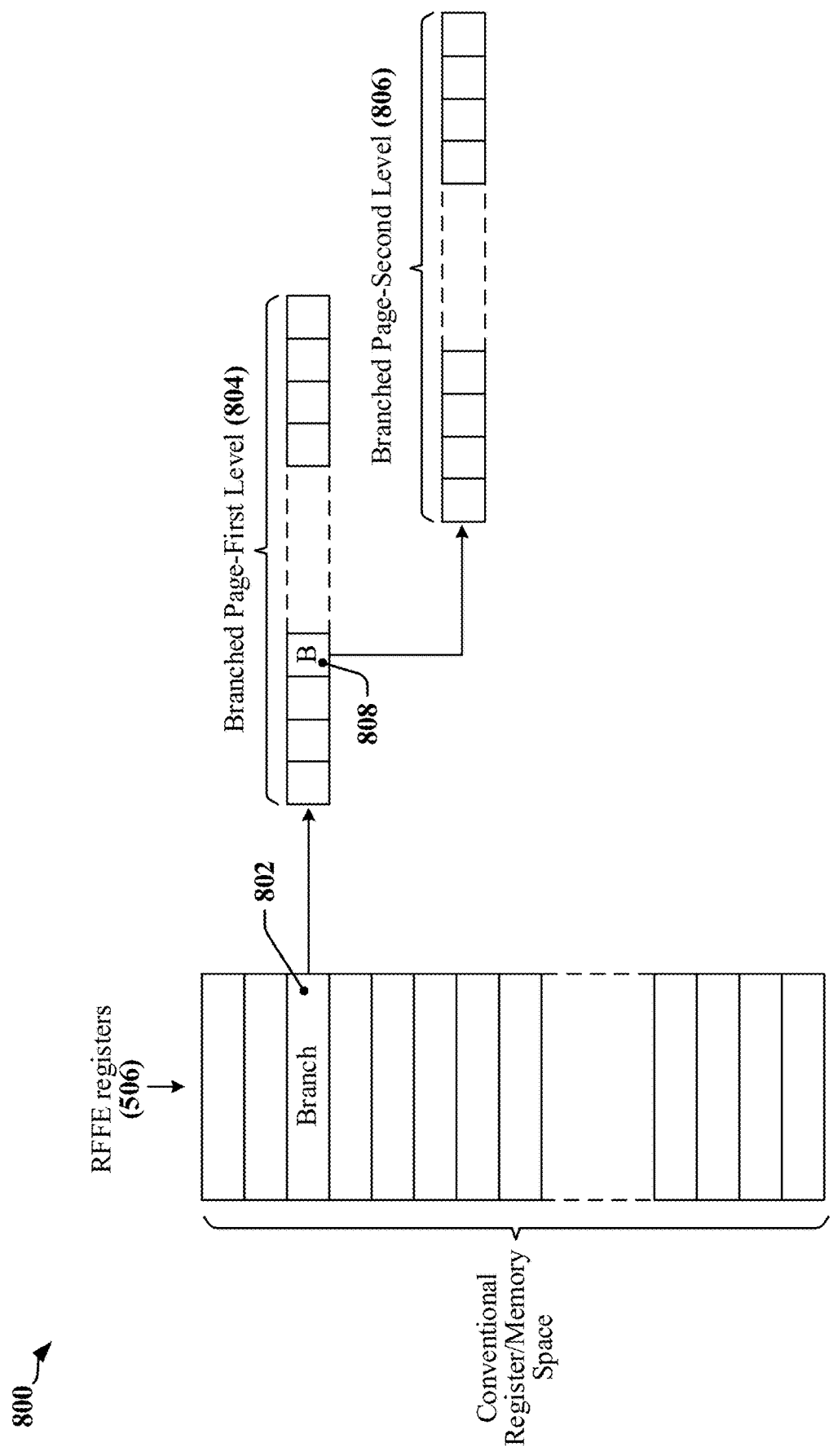
FIG. 8 illustrates a second example of branched-paging in accordance with certain aspects disclosed herein.

FIG. 8 illustrates a second example 800 of branched-paging based on predefined address identification. The addresses of certain registers in the RFFE registers 506 may be designated as branch addresses 802. When a datagram is directed to a branch address 802, the payload of the register is redirected to registers in an extension page 804 associated with the branch addresses 802. Additional addressing information in the payload identifies a start address in the extension page 804 for writing the remaining data in the payload.

In this example 800, the extension pages payload can be directed to a start address in the extension page 804 that is itself a branch address 808. When a datagram has been directed to the branch address 808 in the extension page 804, the payload of the register may be redirected to registers in a second-level extension page 806 associated with the branch address 808. Additional addressing information in the payload identifies a start address in the extension page 806 for writing the remaining data in the payload. Multiple levels of branching may be supported. With each branch, the number of data bytes in the payload is decreased by the one byte used as a start address 710 in the corresponding extension page 804, 806.

Figure 9:
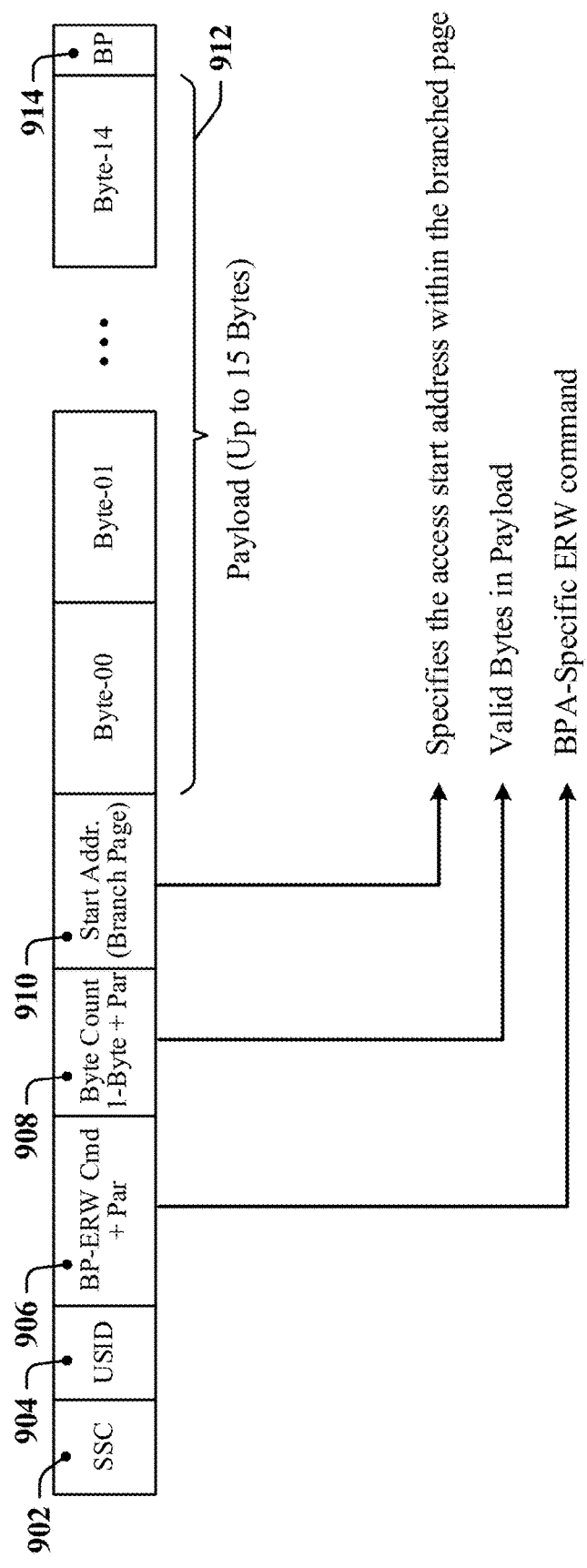
FIG. 9 illustrates a second example of a datagram that may be used to access registers in an extension page in accordance with certain aspects disclosed herein.

FIG. 9 illustrates an example of a datagram 900 that may be used to access registers in an extension page 606 or 610 when branched-paging is based on an explicit branched-paging command code. The branched-paging command code may be recognized by a protocol handler adapted to handle the protocol enhancement. In the illustrated example, the datagram 900 is based on an RFFE datagram that conveys an extended read or write command. The datagram 900 commences with transmission of a two-bit SSC 902 followed by a four-bit unique slave identifier (USID 904). A nine-bit command field 906 has an eight-bit command code and a parity bit. The command code may be a branched-paging read or write command code command used to access an extension page 606 or 610.

The command field 906 is followed by a payload size field 908 that carries an eight-bit byte count and a parity bit. A protocol handler in a receiving slave device may be adapted to direct the target of the command to an extension page 606 or 610. The first byte of the payload is repurposed to carry a start address 910 that represents the register address in the extension page 606 or 610 targeted by the command field 906. The remaining payload bytes 912 may be written to registers in the targeted extension page 606 or 610 at addresses commencing at the register address specified by the start address 910. Bus park signaling 914 terminates the datagram 900.

Examples of Processing Circuits and Methods

Figure 10:
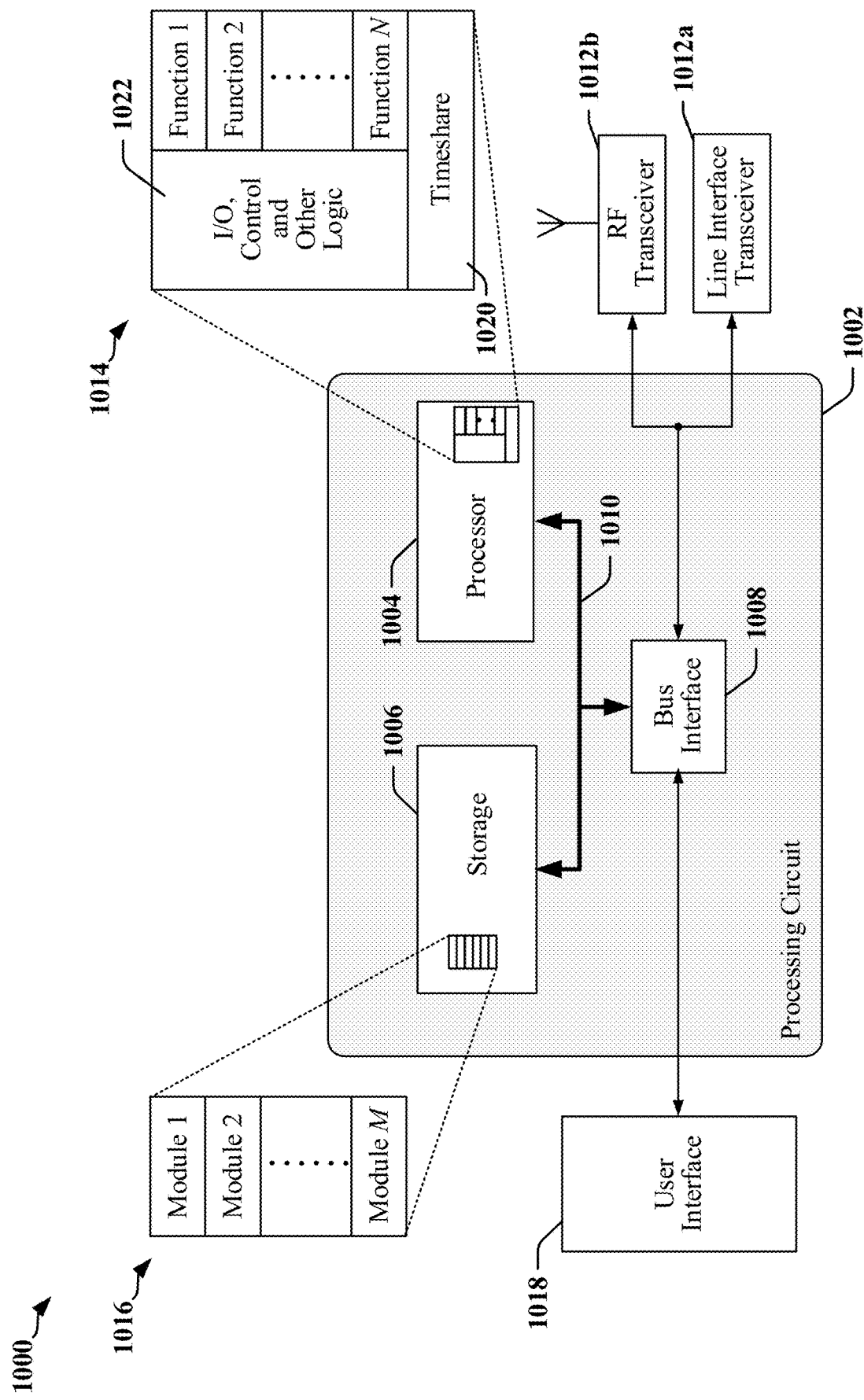
FIG. 10 illustrates one example of an apparatus employing a processing circuit that may be adapted according to certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012*a*, 1012*b*. A transceiver 1012*a*, 1012*b* may be provided for each networking technology supported by the processing circuit. In some instances, multiple networking technologies may share some or all of the circuitry or processing modules found in a transceiver 1012*a*, 1012*b*. Each transceiver 1012*a*, 1012*b* provides a means for communicating with various other apparatus over a transmission medium. In one example, a transceiver 1012*a* may be used to couple the apparatus 1000 to a multi-wire bus. In another example, a transceiver 1012*b* may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. The computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012*a*, 1012*b*, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012a, 1012b, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
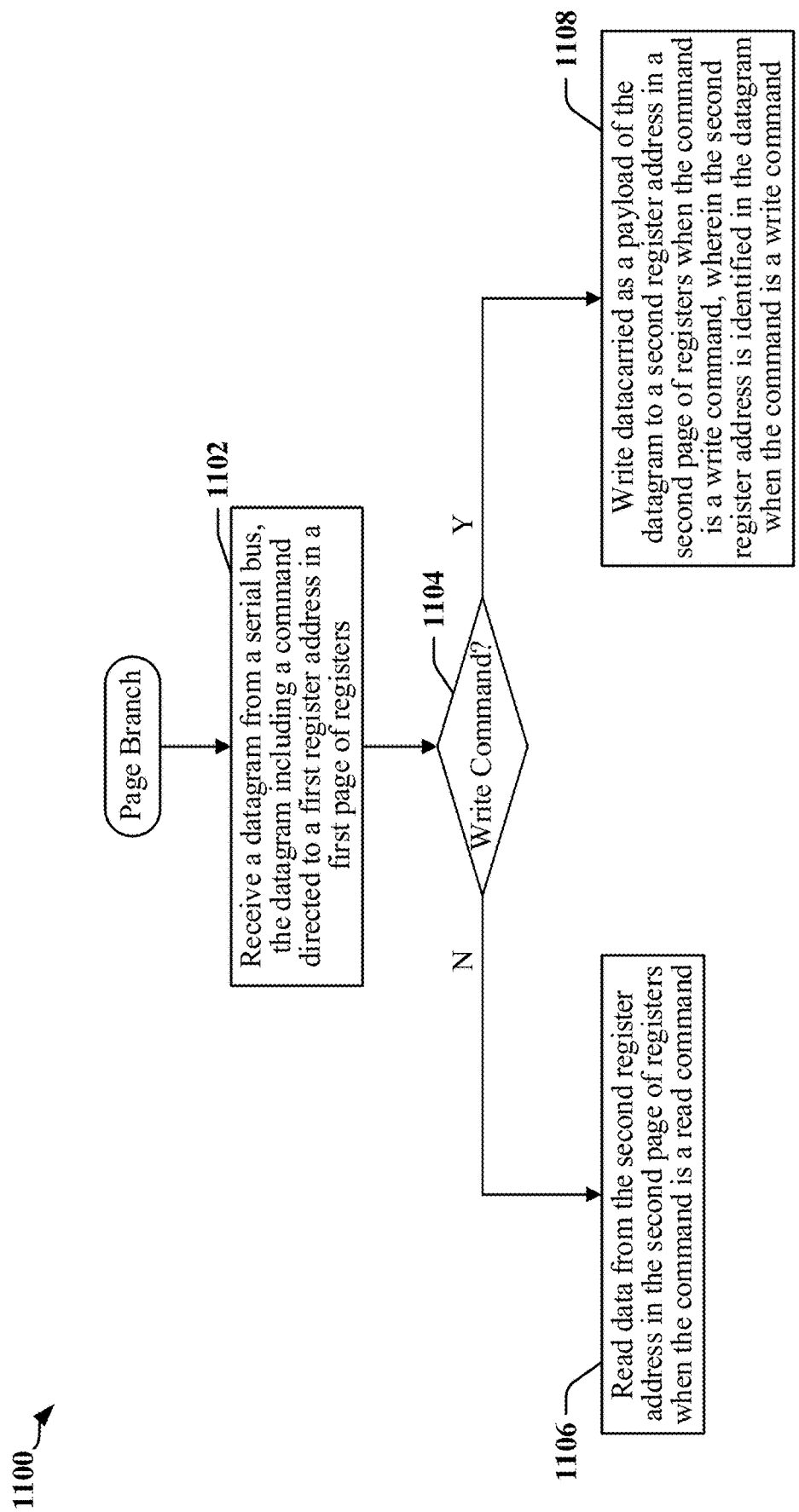
FIG. 11 is a flowchart that illustrates certain aspects disclosed herein.

FIG. 11 is a flowchart 1100 of a method that may be performed by a device coupled to a serial bus. In one example, the serial bus may be operated in accordance with an RFFE protocol. At block 1102, the device may receive a datagram from the serial bus. The datagram may include a command directed to a first register address in a first page of registers. In some instances, the serial bus is operated in accordance with an RFFE protocol and the command is an extended register write command or an extended register read command, or based on an extended register write command or an extended register read command. At block 1104, the device may determine whether the command is a write command or read command. When the command is a read command then at block 1106, the device may read data from the second register address in the second page of registers. At block 1108, the device may write data carried as a payload of the datagram to a second register address in a second page of registers when the command is a write command. The second register address may be identified in the datagram when the command is a write command.

In certain examples, the device may receive configuration information identifying the first register address as a branch address, and identify the second page of registers based on an association of the first register address with the second page of registers defined by the configuration information. The second register address may be identified in the payload when the command is a write command.

In one example, the device may identify a third page of registers based on an association of the first register address with the third page of registers defined by configuration information. The device may identify the second page of registers based on an association of a third register address in the third page of registers with the second page of registers that is defined by the configuration information. The third register address may be received in the payload when the command is a write command.

In certain examples, the command is an explicit branched-page command. The device may receive configuration information associating the command with the second page of registers, and identify the second page of registers based on the configuration information. The serial bus may be operated in accordance with an RFFE protocol and the explicit branched-page command may operate as an extended register write command. The serial bus may be operated in accordance with an RFFE protocol and the explicit branched-page command may operate as an extended register read command.

Figure 12:
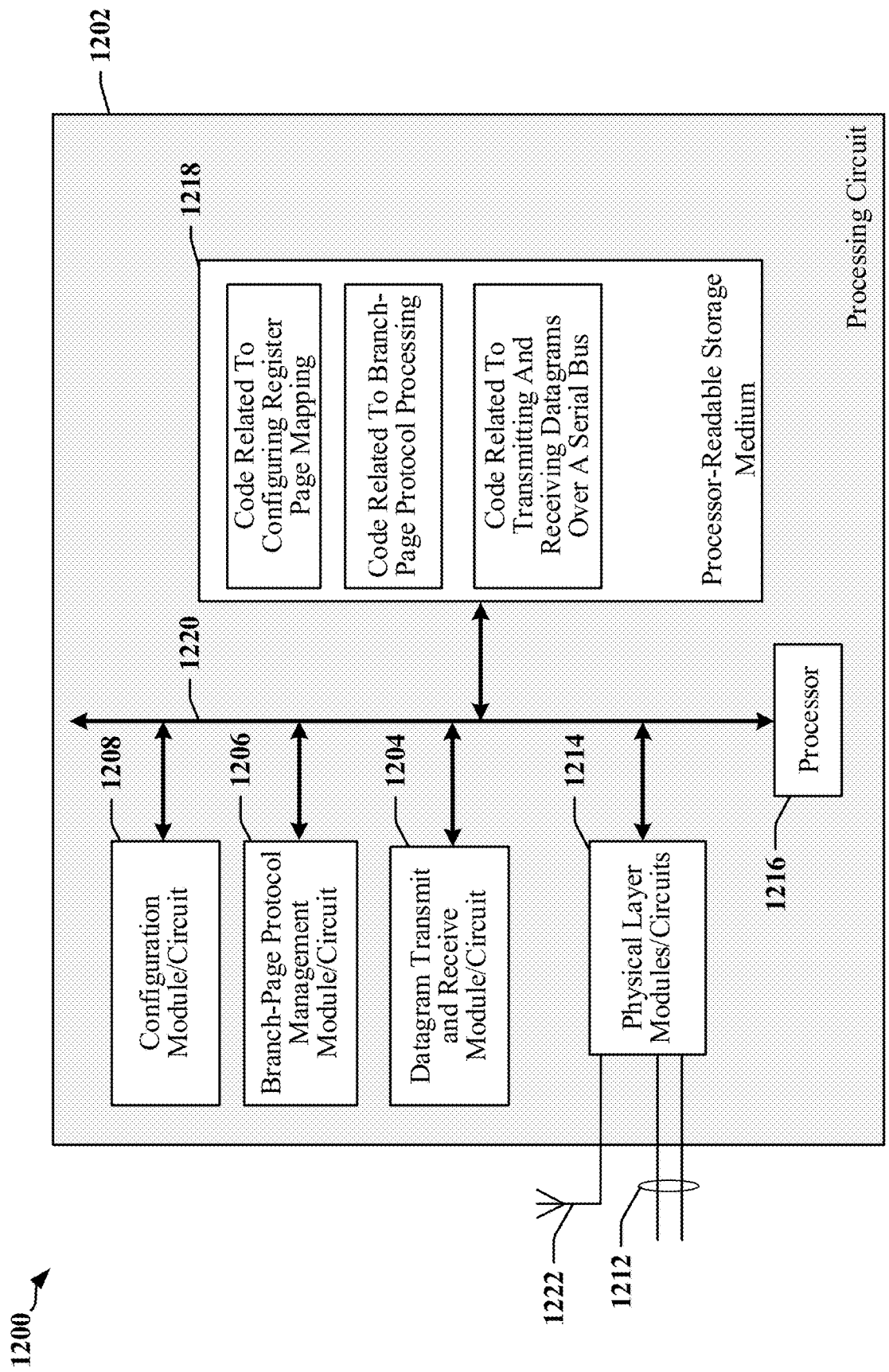
FIG. 12 illustrates an example of a hardware implementation for an apparatus adapted in accordance with certain aspects disclosed herein.

FIG. 12 is a diagram illustrating a simplified example of a hardware implementation for an apparatus 1200 employing a processing circuit 1202. The processing circuit typically has a controller or processor 1216 that may include one or more microprocessors, microcontrollers, digital signal processors, sequencers and/or state machines. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the controller or processor 1216, the modules or circuits 1204, 1206 and 1208 and the processor-readable storage medium 1218. One or more physical layer circuits and/or modules 1214 may be provided to support communication over a communication link implemented using a multi-wire bus 1212, through an antenna or antenna array 1222 (to a radio access network for example), and so on. The bus 1220 may also link various other circuits such as timing sources, peripherals, voltage regulators, and power management circuits, which are well known in the art, and therefore, will not be described any further.

The processor 1216 is responsible for general processing, including the execution of software, code and/or instructions stored on the processor-readable storage medium 1218. The processor-readable storage medium 1218 may include a non-transitory storage medium. The software, when executed by the processor 1216, causes the processing circuit 1202 to perform the various functions described supra for any particular apparatus. The processor-readable storage medium 1218 may be used for storing data that is manipulated by the processor 1216 when executing software. The processing circuit 1202 further includes at least one of the modules 1204, 1206 and 1208. The modules 1204, 1206 and 1208 may be software modules running in the processor 1216, resident/stored in the processor-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes modules and/or circuits 1208 adapted to manage memory map configuration. The apparatus 1200 may include modules and/or circuits 1206 adapted to handle a branch-page protocol, and modules and/or circuits 1204 adapted to configure, conduct and/or participate in a transaction over the serial bus.

In one example, the apparatus 1200 includes physical layer circuits and/or modules 1214 that implement an interface circuit adapted to couple the apparatus 1200 to a serial bus. The apparatus 1200 may have a processor 1216 configured to receive a datagram from a serial bus, the datagram including a command directed to a first register address in a first page of registers. The processor 1216 may be further configured to write data in a payload of the datagram to a second register address in a second page of registers when the command is a write command, and read data from the second register address in the second page of registers when the command is a read command. The second register address may be identified in the datagram when the command is a write command.

The processor 1216 may be further configured to receive configuration information identifying the first register address as a branch address, and identify the second page of registers based on an association of the first register address with the second page of registers defined by the configuration information. The command may be a write command and the second register address may be identified in the payload.

The processor 1216 may be further configured to identify a third page of registers based on an association of the first register address with the third page of registers defined by configuration information, and identify the second page of registers based on an association of a third register address in the third page of registers with the second page of registers that is defined by the configuration information. The third register address may be received in the payload when the command is a write command.

In some instances, the command is an explicit branched-page command and the processor 1216 may be further configured to receive configuration information associating the command with the second page of registers, and identify the second page of registers based on the configuration information. The serial bus may be operated in accordance with a Radio Frequency Front-End protocol and the explicit branched-page command may operate as an extended register write or read command.

The processor-readable storage medium 1218 may include transitory or non-transitory storage devices configured to store code, instructions and/or parameters used to implement one or more methods or procedures disclosed herein. The processor-readable storage medium 1218 may include code for receiving a datagram from a serial bus, the datagram including a command directed to a first register address in a first page of registers, writing data in a payload of the datagram to a second register address in a second page of registers when the command is a write command, and reading data from the second register address in the second page of registers when the command is a read command. The second register address may be identified in the datagram when the command is a write command.

The processor-readable storage medium 1218 may include code for receiving configuration information identifying the first register address as a branch address, and identifying the second page of registers based on an association of the first register address with the second page of registers defined by the configuration information. The second register address may be identified in the payload when the command is a write command.

The processor-readable storage medium 1218 may include code for identifying a third page of registers based on an association of the first register address with the third page of registers defined by configuration information, and identifying the second page of registers based on an association of a third register address in the third page of registers with the second page of registers that is defined by the configuration information. The third register address may be received in the payload when the command is a write command.

The processor-readable storage medium 1218 may include code for receiving configuration information associating the command with the second page of registers, and identifying the second page of registers based on the configuration information. The command may be an explicit branched-page command.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communication, comprising:
receiving a datagram from a serial bus, the datagram including a command directed to a first register address in a first page of registers;
writing data carried as a payload of the datagram to a second register address in a second page of registers when the command is a write command; and
reading data from the second register address in the second page of registers when the command is a read command,
wherein the second register address in the second page of registers is identified based on an association of the first register address with the second page of registers.

2. The method of claim 1, further comprising:
receiving configuration information identifying the first register address as a branch address; and
identifying the second page of registers based on the association of the first register address with the second page of registers defined by the configuration information.

3. The method of claim 2, wherein the command is a write command and the second register address is identified in the payload.

4. The method of claim 1, further comprising:
identifying a third page of registers based on an association of the first register address with the third page of registers defined by configuration information; and
identifying the second page of registers based on an association of a third register address in the third page of registers with the second page of registers that is defined by the configuration information, wherein the third register address is received in the payload when the command is a write command.

5. The method of claim 1, wherein the command is an explicit branched-page command.

6. The method of claim 5, further comprising:
receiving configuration information associating the command with the second page of registers; and
identifying the second page of registers based on the configuration information.

7. The method of claim 5, wherein the serial bus is operated in accordance with a Radio Frequency Front-End protocol and the explicit branched-page command operates as an extended register write command.

8. The method of claim 5, wherein the serial bus is operated in accordance with a Radio Frequency Front-End protocol and the explicit branched-page command operates as an extended register read command.

9. The method of claim 1, wherein the serial bus is operated in accordance with a Radio Frequency Front-End protocol and the command is an extended register write command.

10. The method of claim 1, wherein the serial bus is operated in accordance with a Radio Frequency Front-End protocol and the command is an extended register read command.

11. An apparatus comprising:
an interface circuit adapted to couple the apparatus to a serial bus; and
a processor configured to:
receive a datagram from the serial bus, the datagram including a command directed to a first register address in a first page of registers;
write data carried as a payload of the datagram to a second register address in a second page of registers when the command is a write command; and
read data from the second register address in the second page of registers when the command is a read command,
wherein the second register address in the second page of registers is identified based on an association of the first register address with the second page of registers.

12. The apparatus of claim 11, wherein the processor is further configured to:
receive configuration information identifying the first register address as a branch address; and
identify the second page of registers based on the association of the first register address with the second page of registers defined by the configuration information.

13. The apparatus of claim 12, wherein the command is a write command and the second register address is identified in the payload.

14. The apparatus of claim 11, wherein the processor is further configured to:
identify a third page of registers based on an association of the first register address with the third page of registers defined by configuration information; and
identify the second page of registers based on an association of a third register address in the third page of registers with the second page of registers that is defined by the configuration information, wherein the third register address is received in the payload when the command is a write command.

15. The apparatus of claim 11, wherein the command is an explicit branched-page command.

16. The apparatus of claim 15, wherein the processor is further configured to:
receive configuration information associating the command with the second page of registers; and
identify the second page of registers based on the configuration information.

17. The apparatus of claim 15, wherein the serial bus is operated in accordance with a Radio Frequency Front-End protocol and the explicit branched-page command operates as an extended register write command.

18. The apparatus of claim 15, wherein the serial bus is operated in accordance with a Radio Frequency Front-End protocol and the explicit branched-page command operates as an extended register read command.

19. The apparatus of claim 11, wherein the serial bus is operated in accordance with a Radio Frequency Front-End protocol and the command is an extended register write command.

20. The apparatus of claim 11, wherein the serial bus is operated in accordance with a Radio Frequency Front-End protocol and the command is an extended register read command.

21. A non-transitory processor-readable storage medium comprising code, which, when executed by a processor, causes the processor to:
receive a datagram from a serial bus, the datagram including a command directed to a first register address in a first page of registers;
write data carried as a payload of the datagram to a second register address in a second page of registers when the command is a write command; and
read data from the second register address in the second page of registers when the command is a read command,
wherein the second register address in the second page of registers is identified based on an association of the first register address with the second page of registers.

22. The storage medium of claim 21, further comprising code, which, when executed by the processor, causes the processor to:
receive configuration information identifying the first register address as a branch address; and
identify the second page of registers based on the association of the first register address with the second page of registers defined by the configuration information, wherein the second register address is identified in the payload when the command is a write command.

23. The storage medium of claim 21, further comprising code, which, when executed by the processor, causes the processor to:
identify a third page of registers based on an association of the first register address with the third page of registers defined by configuration information; and
identify the second page of registers based on an association of a third register address in the third page of registers with the second page of registers that is defined by the configuration information, wherein the third register address is received in the payload when the command is a write command.

24. The storage medium of claim 21, further comprising code, which, when executed by the processor, causes the processor to:

receive configuration information associating the command with the second page of registers; and identify the second page of registers based on the configuration information, wherein the command is an explicit branched-page command.

25. The storage medium of claim 24, wherein the serial bus is operated in accordance with a Radio Frequency Front-End protocol and the explicit branched-page command operates as an extended register write command or an extended register read command.

26. An apparatus comprising:
means for receiving datagrams from a serial bus, wherein the means for receiving datagrams receives a first datagram that includes a command directed to a first register address in a first page of registers;
means for writing data carried as a payload of the first datagram to a second register address in a second page of registers when the command is a write command; and
means for reading data from the second register address in the second page of registers when the command is a read command,
wherein the second register address in the second page of registers is identified based on an association of the first register address with the second page of registers.

27. The apparatus of claim 26, wherein the means for receiving datagrams is configured to receive configuration information identifying the first register address as a branch address, wherein the second page of registers is identified based on the association of the first register address with the second page of registers defined by the configuration information, and wherein the second register address is identified in the payload when the command is a write command.

28. The apparatus of claim 26, wherein a third page of registers is identified based on an association of the first register address with the third page of registers defined by configuration information, wherein the second page of registers is identified based on an association of a third register address in the third page of registers with the second page of registers that is defined by the configuration information, and wherein the third register address is received in the payload when the command is a write command.

29. The apparatus of claim 26, wherein the means for receiving datagrams is configured to receive configuration information associating the command with the second page of registers, wherein the second page of registers is identified based on the configuration information, and wherein the command is an explicit branched-page command.

30. The apparatus of claim 26, wherein the serial bus is operated in accordance with a Radio Frequency Front-End protocol and the command is an extended register write command or an extended register read command.

* * * * *